US005105219A

United States Patent [19]

Yoshikado

[11] Patent Number: 5,105,219

[45] Date of Patent: Apr. 14, 1992

[54] DEVELOPING TONER DETECTING DEVICE

[75] Inventor: Shoji Yoshikado, Saitama, Japan

[73] Assignee: Fuji Xerox Co., Ltd., Tokyo, Japan

[21] Appl. No.: 599,127

[22] Filed: Oct. 17, 1990

[30] Foreign Application Priority Data

Nov. 8, 1989 [JP] Japan ........ 1-290706

[51] Int. Cl.[5] ........ G03G 15/00; H04N 1/00

[52] U.S. Cl. ........ 355/206; 355/245; 355/308

[58] Field of Search ........ 355/203-209, 355/245, 246, 308

[56] References Cited

U.S. PATENT DOCUMENTS 4,627,715 12/1986 Kikuno ........ 355/206
4,669,856 6/1987 Yamada ........ 355/209
4,745,440 5/1988 Kono et al. ........ 355/208
4,922,294 5/1990 Nakagami et al. ........ 355/209

FOREIGN PATENT DOCUMENTS 60-129763 7/1985 Japan ........ 355/206

*Primary Examiner*—Joan H. Pendergrass
*Attorney, Agent, or Firm*—Finnegan, Henderson, Farabow, Garrett and Dunner

[57] ABSTRACT

An image recording apparatus in which said image recording apparatus has a toner supplied by a developing portion provided separately from a photosensitive material to form a toner latent image thereon, said toner later image is transferred onto a recording paper thereby recording said image, said image recording apparatus comprising, developing toner detecting device for detecting a predetermined quantity of a residual toner, paper number detecting device for detecting the number of said recording paper which has been recorded before detecting said predetermined quantity of said residual toner, and calculating device for calculating the number of recording sheet to be recorded to which the number of said recording sheet is calculated by the basis of said predetermined quantity of said residual toner and the number of recording paper before detecting said predetermined quantity of said residual toner.

4 Claims, 2 Drawing Sheets

DEVELOPING TONER DETECTING DEVICE

BACKGROUND OF THE INVENTION

The present invention relates to a developing toner detecting device for an image recording apparatus for recording an image by a toner latent image.

Conventionally, in an image recording apparatus of this kind, a toner supplied by a developing portion constituted by an independent unit provided separately from a photo-sensitive material electrically charged by oscillated laser light or the like is made to adhere onto the photo-sensitive material so as to form a toner latent image thereon, and the thus formed toner latent image is transferred onto recording paper to thereby perform image recording thereon. In the developing portion, there is provided a developing toner detecting device such as a toner detecting sensor or the like. The developing toner detecting device detects the fact that the quantity of residual toner in the developing portion has reached a predetermined value, and after performing copying on a predetermined number of sheets after the above-mentioned detection of the predetermined residual toner quantity, the developing toner detecting device informs a user of the fact that toner of the developing portion has been used up to thereby request the user to stop image recording and replace a unit in the developing portion.

In the above-mentioned image recording apparatus, there is a problem in the following point. That is, image recording can be performed on a certain number of sheets even after the developing toner detecting device has detected the predetermined residual toner quantity as described above. However, since the quantity of consumption of the developing toner may largely vary in accordance with contents of a user's document which is to be subject to image recording, the developing toner detecting device stops the use of the above-mentioned toner when image recording has been made on a minimum predetermined number of sheets after detection of the predetermined residual toner quantity. Accordingly, in spite of the fact that toner still remains in the above-mentioned developing portion by a quantity enough to form toner latent images, it is required to replace the unit of the developing portion and toner is thus wastefully consumed.

SUMMARY OF THE INVENTION

The present invention was attained in view of the above-mentioned problem, and an object thereof is to provide a developing toner detecting device in which the number of sheets of recording paper on which image recording can be performed after detection of the predetermined quantity of residual toner in the developing portion can be correctly determined in accordance with each user.

According to the present invention, in an image recording apparatus in which toner of a developing portion constituted by an independent unit provided separately from a photo-sensitive body electrically charged by a charger or the like is made to adhere onto the photo-sensitive body so as to form a toner latent image thereon and the thus formed toner latent image is transferred onto recording paper to thereby perform image recording thereon, a developing toner detecting device comprises: a toner detection means constituted by a toner detecting sensor, a CPU, etc., for detecting a predetermined quantity of residual toner in the developing portion; a sheet number detection means constituted by a recording paper sensor, a CPU, etc., for detecting the number of sheets of recording paper on which image recording has been performed before the predetermined quantity of residual toner in the developing portion is detected; and another sheet number detection means constituted by a CPU, etc., for detecting the number of sheets of recording paper on which image recording can be further performed, on the basis of the predetermined quantity of residual toner and the detected number of sheets of recording paper on which image recording have been performed.

The number of sheets of recording paper on which image recording can be performed is detected on the basis of the quantity of residual toner detected by the toner detection means and the number of sheets of recording paper on which image recording have been performed detected by the sheet number detection means.

Accordingly, before detection of the quantity of residual toner in the developing portion, the number of sheets of recording paper on which image recording can be performed in accordance with each user after detection of the quantity of residual toner in the developing portion can be correctly detected on the basis of the number of sheets of recording paper on which the user has already performed the image recording.

DETAILED DESCRIPTION OF THE PREFERRED EMBODIMENTS

Figure 1:
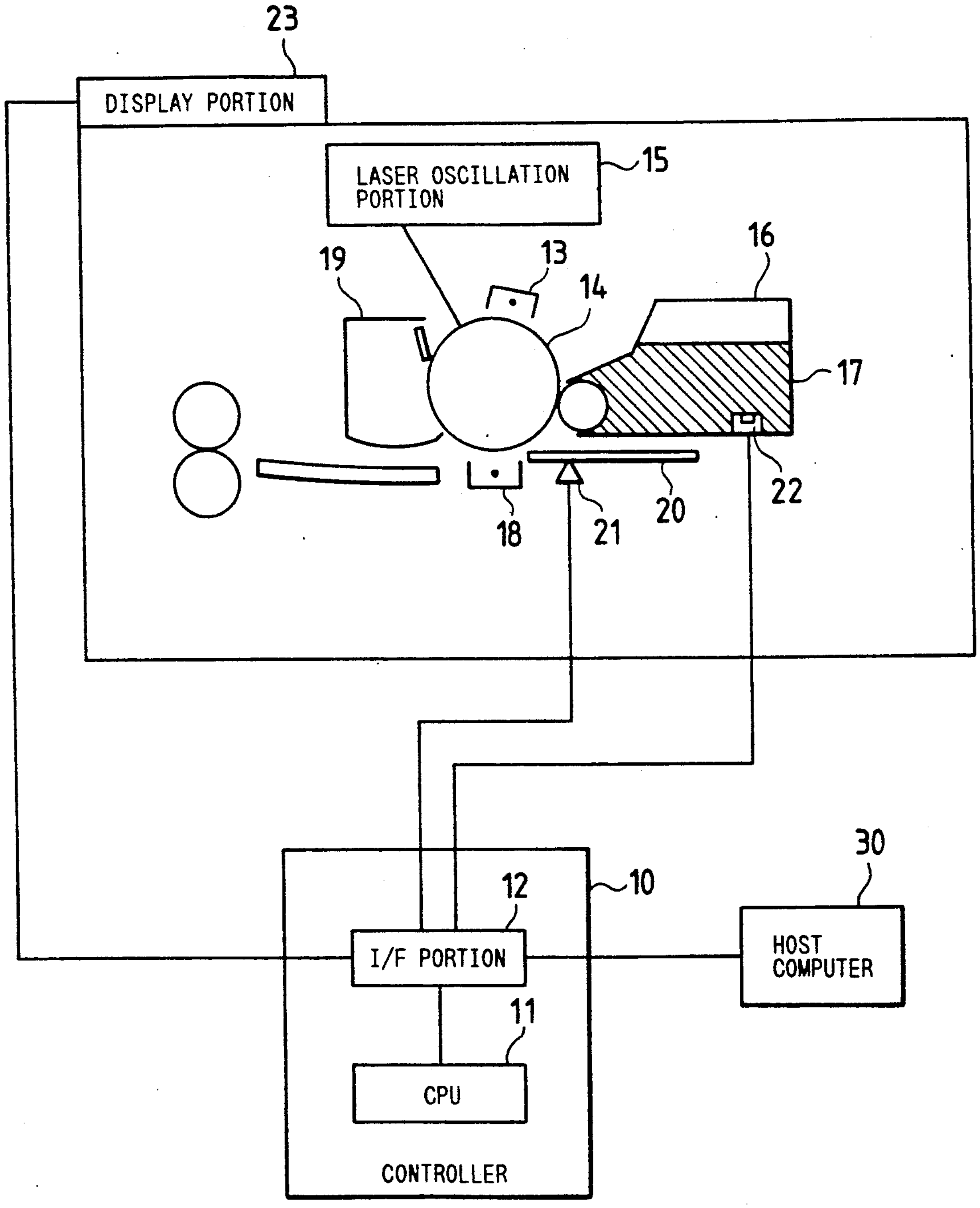
FIG. 1 is a block diagram showing the schematic configuration of the image recording apparatus according to the present invention.
Figure 2:
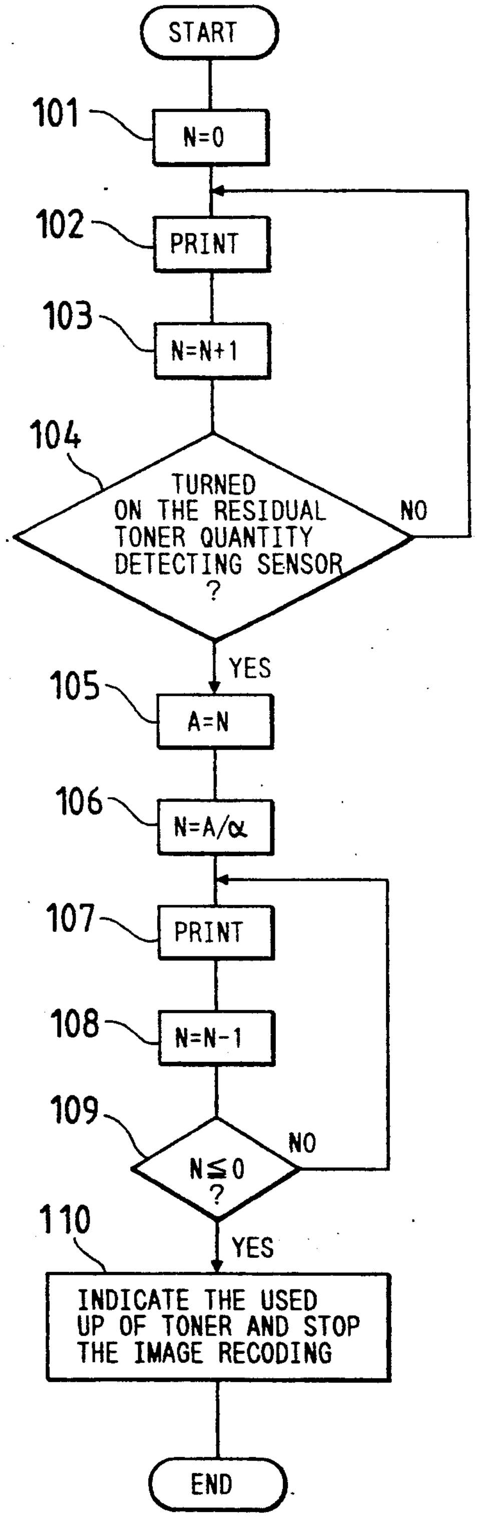
FIG. 2 is a flowchart for explaining the toner detecting operation by means of the controller shown in FIG. 1.

Referring to FIGS. 1 and 2 of the drawings, an embodiment of the present invention will now be described in detail.

FIG. 1 is a block diagram showing the schematic configuration of the image recording apparatus according to the present invention. In the drawing, a controller 10 is constituted by a central processing unit (hereinafter referred to as "CPU") 11, an interface portion 12, and so on. The controller 10 controls the whole of image recording in a manner so that, in response to a print command from a host computer 30, it causes a charger 13 constituting the image recording apparatus to electrically charge a photo-sensitive body 14 and causes a laser oscillation portion is to generate laser light thereby form an electrostatic latent image on the photo-sensitive body 14. The controller 10 further causes toner 17 of a developing portion 16 which is constituted by an independent unit provided separately from the photo-sensitive body 14 to adhere onto the photo-sensitive body 14 to form a toner latent image thereon and causes a transfer charger 18 to transfer the toner latent image from the photo-sensitive body 14 onto recording paper 20 which is conveyed into the apparatus, the recording paper 20 being discharged then. The reference numeral 19 designates a cleaner for cleaning toner remaining on the photo-sensitive body 14 after the above-mentioned transfer.

The CPU 11 of the controller 10 detects the number of sheets of recording paper on which recording has been made after the unit of the developing portion 16 has been set in the apparatus, on the basis of a recording paper detection signal supplied to the CPU 11, through the interface portion 12, from a recording paper detecting sensor 21 provided on a conveying path of the recording paper 20, and takes-in a toner residual quantity detection signal, through the interface portion 12, from a toner detecting sensor 22 provided in the developing portion 16. The CPU 11 calculates the number of sheets of recording paper on which image recording can be performed after the above-mentioned detection of the residual toner quantity, on the basis of the detected number of sheets of recording paper on which recording has been made and the taken-in residual toner quantity. Assuming, in advance, the number of sheets of recording paper on which images have been recorded before detection of the residual toner quantity to be A (A being a positive integer) and setting a constant $\alpha$ in accordance with the predetermined residual toner quantity to be detected, the CPU 11 calculates the number N of sheets of recording paper on which image recording can be further performed after detection of the residual toner quantity, from the expression of $N=A/\alpha$ (N being a positive integer).

The controller 10 causes the image recording apparatus to stop image recording through the interface portion 12 on the basis of a recording paper detection signal from the recording paper detecting sensor 21 when the number of sheets of recording paper on which image recording has been performed after detection of the residual toner quantity reaches the calculated number of sheets of recording paper on which image recording can be further performed, and further causes a display portion 23 to indicate the fact that the toner in the developing portion 16 has been used up to thereby inform the user of the necessity of replacement of the developing portion 16. Here, the used up of the toner is detected by subtracting the number of sheets of recording paper on which image recording has been actually performed, after detection of the residual toner quantity from the above-mentioned calculated number N of sheets of recording paper on which image recording can be further performed.

The above-mentioned number N of sheets of recording paper on which image recording has been performed is detected by counting the recording paper on which an image is recorded on the basis of the recording paper detection signal supplied from the recording paper detecting sensor 21. The controller 10 may inform the host computer 30 of the used up of toner.

Next, the toner detecting operation by the CPU 11 of the controller 10 will be described hereunder on the basis of a flowchart of FIG. 2. In FIG. 2, the CPU 11 set the number N of sheets of recording paper on which image recording has been performed to an initial value zero (step 101), and then starts image recording (step 102). Then, the CPU 11 counts up the number N of sheets of recording paper on which image recording has been performed one by one on the basis of the recording paper detection signal from the recording paper detecting sensor 21 for detecting the recording paper 20 (step 103), and waits for turning-on of the residual toner quantity detection signal from the toner detecting sensor 22 (step 104).

When the residual toner quantity detection signal from the toner detecting sensor 22 is turned on, the CPU 11 assumes that the counted-up number N of sheets of recording paper on which image recording has been performed is the number A of sheets of recording paper on which image recording has been performed before detection of the residual toner quantity (step 105), and calculates the number N of sheets of recording paper on which recording can be further made after detection of the residual toner quantity in accordance with the expression of $N=A/\alpha$ (step 106). Assuming here that the constant &A is set to 5 and the number A of sheets of recording paper on which image recording has been performed before detection of the residual toner quantity is 2000, the number N of sheets of recording paper on which recording can be further made after detection of the residual toner quantity is 400. Alternatively, assuming that A is 3000, then N is 600.

Having calculated the number N of sheets of recording paper on which image recording can be further made after detection of the residual toner quantity, the CPU 11 continues the image recording (step 107), counts down the above-mentioned number N of sheets of recording paper on which image recording can be performed one by one (step 108), and judges whether the number N of sheets of recording paper on which image recording can be further performed has become a value not larger than zero (step 109). When the above-mentioned number N of sheets of recording paper on which image recording can be further performed has become a value not larger than zero, the CPU 11 makes the display portion 23 to indicate the used up of toner of the developing portion 16 to thereby inform the user of the necessity of replacement of the developing portion 16 and at the same time causes the image recording apparatus to stop the image recording (step 110).

Thus, according to the present invention, the number of sheets of recording paper on which image recording can be further made with a predetermined quantity of residual toner is detected on the basis of the number of sheets of recording paper on which image recording has been made before detection of the quantity of residual toner in the developing portion and the predetermined quantity of residual toner, and the image recording of the image recording apparatus is stopped when the detected number of sheets of recording paper on which image recording has been performed has reached the calculated number of sheets of recording paper on which image recording can be performed. Accordingly, the number of sheets of recording paper on which image recording can be made in accordance with each user after the detection of the quantity of residual toner in the developing portion can be correctly detected so that image recording can be made till the toner in the developing portion is used up with no remainder and the unit of the developing portion can be replaced efficiently.

According to the present invention, the number of sheets of recording paper on which image recording can be made finally is detected on the basis of the detected quantity of residual toner and the number of sheets of recording paper on which image recording has been performed before the above-mentioned before detection of the quantity of residual toner. Accordingly, the number of sheets of recording paper on which image recording can be finally made in accordance with each user after the detection of the quantity of residual toner in the developing portion can be correctly detected till the developing toner can be used up efficiently.

What is claimed is:

1. An image recording apparatus in which a toner is supplied by a developing portion, provided separately from a photosensitive material, to form toner latent images on the photosensitive material, said toner latent images being transferred onto sheets of recording paper to record said images, said image recording apparatus comprising:

toner detecting means for detecting a predetermined quantity of toner remaining in said developing portion;

paper number detecting means for detecting a first number of said sheets of recording paper on which images have been recorded before said toner detecting means detects said predetermined quantity of toner; and calculating means for calculating a second number of sheets of recording paper on which images may be formed after said toner detecting means detects said predetermined quantity of toner, said second number of sheets being calculated on the basis of said predetermined quantity of toner and said first number of sheets of recording paper.

2. An image recording device as claimed in claim 1, further comprising:

image recording operation stopping means for stopping said image recording apparatus when the number of sheets of recording paper on which images have been recorded after said toner detecting means detects said predetermined quantity of toner reaches said second number of sheets of recording paper.

3. An image recording device as claimed in claim 1, wherein said second number of sheets of recording paper is calculated by said calculating means to meet the following condition:

$$I=A/\alpha$$

wherein N represents the number of sheets of recording paper on which images are to be recorded after said toner detecting means detects said predetermined quantity of toner, A represents the number of sheets of recording paper on which images were recorded before said toner detecting means detects said predetermined quantity of toner, and $\alpha$ represents a predetermined number.

4. An image recording apparatus according to claim 1, wherein said paper number detecting means detects the number of sheets of recording paper on which images have been formed after said toner detecting means detects said predetermined quantity of toner.

* * * * *

UNITED STATES PATENT AND TRADEMARK OFFICE

CERTIFICATE OF CORRECTION

PATENT NO. : 5,105,219

DATED : April 14, 1992

INVENTOR(S) : Shoji Yoshikado

It is certified that error appears in the above-identified patent and that said Letters Patent is hereby corrected as shown below:

On the Title page, item [57]
Abstract, line 5, change "later" to --latent--.

Claim 3, column 6, line 11, change "$I=A/\alpha$" to --$N=A/\alpha$--.

Signed and Sealed this

Nineteenth Day of October, 1993

Attest:

Bruce Lehman

BRUCE LEHMAN

*Attesting Officer* *Commissioner of Patents and Trademarks*